(12) United States Patent
Richardson et al.

(10) Patent No.: US 11,180,095 B1
(45) Date of Patent: Nov. 23, 2021

(54) ADAPTIVE MANIFOLD SYSTEM

(71) Applicant: NEXANS, Courbevoie (FR)

(72) Inventors: Jeremy Richardson, Butler, PA (US);
Brad A. Angus, North Lima, OH (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/022,865

(22) Filed: Sep. 16, 2020

(51) Int. Cl.
*B60R 16/02* (2006.01)
(52) U.S. Cl.
CPC ................. *B60R 16/0215* (2013.01)
(58) Field of Classification Search
CPC .................................. B60R 16/0215
USPC ....................................... 174/72 A
See application file for complete search history.

(56) References Cited

U.S. PATENT DOCUMENTS

| | | | | |
|---|---|---|---|---|
| 3,711,633 A * | 1/1973 | Ghirardi | ................ | H02G 15/18 174/135 |
| 4,797,512 A * | 1/1989 | Kumagai | ................ | H02G 15/18 174/135 |
| 7,581,564 B2 * | 9/2009 | Tanaka | ................ | H02G 3/06 138/110 |
| 10,707,660 B2 * | 7/2020 | Chu | ................ | H01B 7/0045 |
| 2008/0277015 A1 * | 11/2008 | Tanaka | ................ | H02G 3/0468 138/110 |
| 2012/0276762 A1 * | 11/2012 | Hohner | ................ | H01R 13/658 439/98 |

* cited by examiner

*Primary Examiner* — Timothy J Thompson
*Assistant Examiner* — Michael F McAllister
(74) *Attorney, Agent, or Firm* — Sofer & Haroun, LLP (57) ABSTRACT

An adaptive manifold includes first and second halves of a manifold body, connected via a hinge, with at last two openings, where the haves are closeable to receive and retain at least two different conduits into the at least two openings. Each of the openings in the manifold are uniformly sized and has a plurality of arcuate retention ribs. Each of the openings are configured to receive a sizing adapter, each sizing adapter having a plurality of securing ribs having an inside and outside surface, such that the outside surface of the securing ribs of the sizing adapters are uniformly sized, arcuate, and adapted to be interfit between the retention ribs of the opening. The inside surfaces of the securing ribs are arcuate and dimensioned to fit into a corrugation of a conduit, so that when the manifold is closed, the conduits are engaged with the inside surfaces of the sizing adapters retaining the conduits within the openings of the manifold.

9 Claims, 12 Drawing Sheets

FIG. 1
(PRIOR ART)

| NW | ⌀-I in mm | ⌀-A in mm |
|---|---|---|
| 3 | 3,0 | 5,1 |
| 4,5 | 4,8 | 7,1 |
| 5 | 5,0 | 7,1 |
| 6 | 6,0 | 8,6 |
| 7,5 | 6,9 | 9,9 |
| 8,5 | 8,5 | 11,4 |
| 10 | 10,1 | 12,6 |
| 11 | 10,8 | 13,6 |
| 12 | 12,0 | 15,6 |
| 13 | 12,9 | 15,8 |
| 14 | 14,5 | 18,4 |
| 16 | 15,2 | 18,7 |
| 17 | 16,8 | 21,0 |
| 19 | 19,4 | 24,0 |
| 22 | 21,8 | 25,5 |
| 23 | 23,7 | 28,0 |
| 26 | 26,1 | 31,0 |
| 29 | 29,3 | 33,9 |
| 33 | 33,1 | 38,2 |
| 37 | 33,8 | 41,6 |
| 50 | 45,2 | 53,2 |

ADAPTIVE MANIFOLD SYSTEM

FIELD OF THE INVENTION

This application relates to an adaptive manifold system for wire harness. More particularly the present application relates an adaptive manifold system for universally connecting conduit segments of different sizes in a wire harness

DESCRIPTION OF RELATED ART

In the field of automotive construction and other industrial settings, a wire harness refers to a pre-fabricated network of conduits and wires therein that are designed to be later installed into electrical systems. In the case of automotive constructions, a pre-formed wire harness may include any number of wires and connection elements, passing through various conduits for eventual installation in the engine compartment of a motor vehicle to connect the electric components. Such harnesses are designed by the engineer and often include a sizeable network of connections and intersections.

Figure 1:
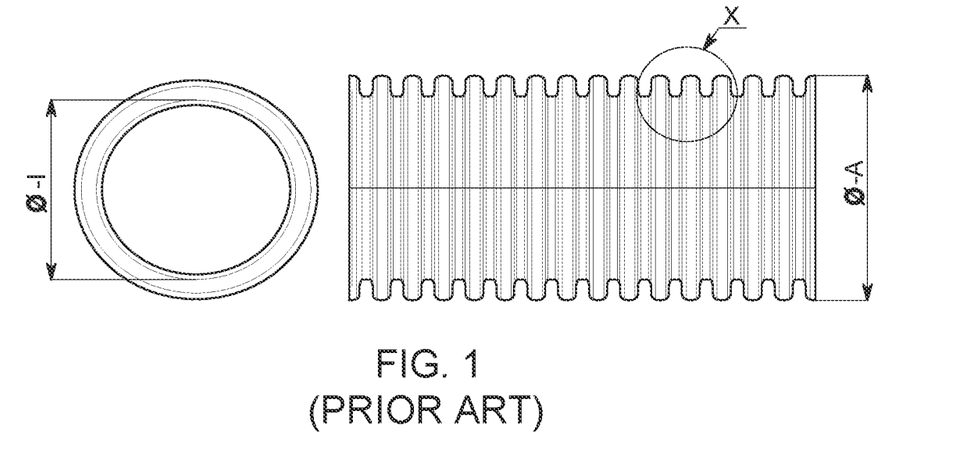
FIG. 1 shows a prior art flexible corrugated plastic conduit for use in a wire harness.
Figure 2:
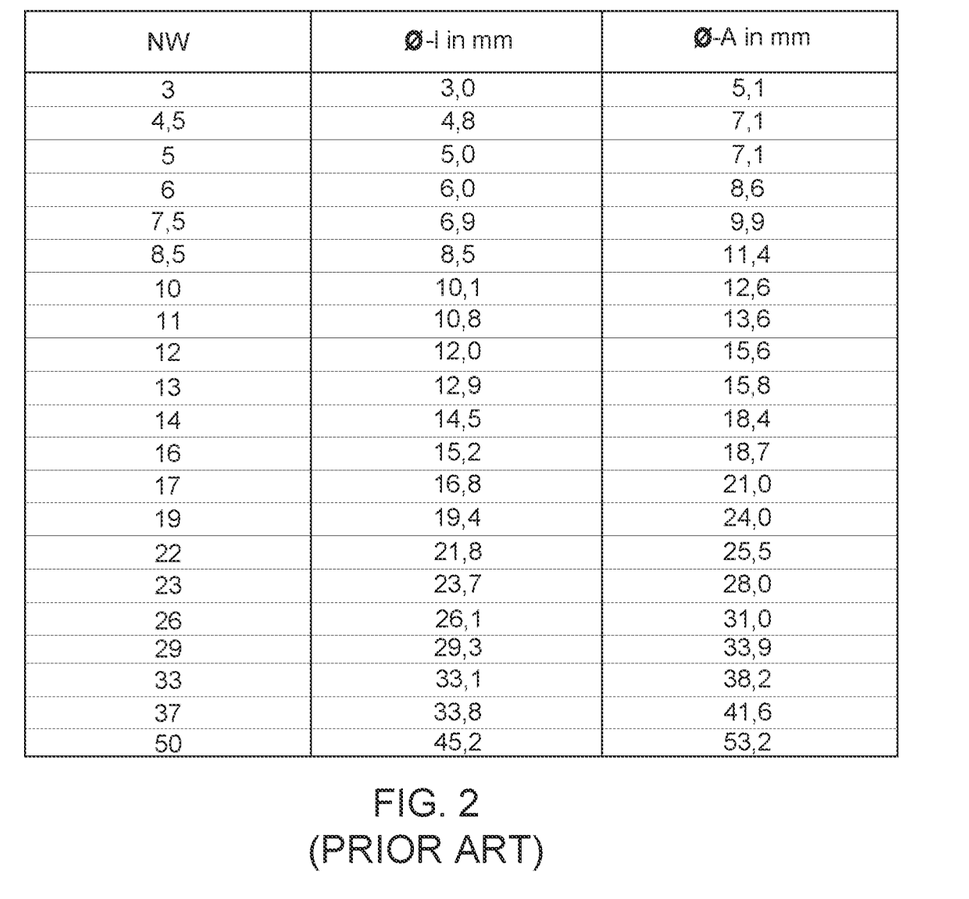
FIG. 2 shows a prior art table of common sizes for the prior art flexible corrugated plastic conduit of FIG. 1.

Such harnesses are usually assembled as connections of conduit segments intersecting at different shaped connectors or "manifolds." The conduit segments are usually flexible corrugated conduit segments as shown in prior art FIG. 1 and sized as required according to for example in prior art FIG. 2. NW in FIG. 2 refers to nominal width so for example NW 7.5 as shown in the table has a "nominal width" of 7.5 mm with an inner diameter of the inner most corrugation of 6.9 mm and with an outer diameter of the outer most corrugation of 9.9 mm.

Figure 3:
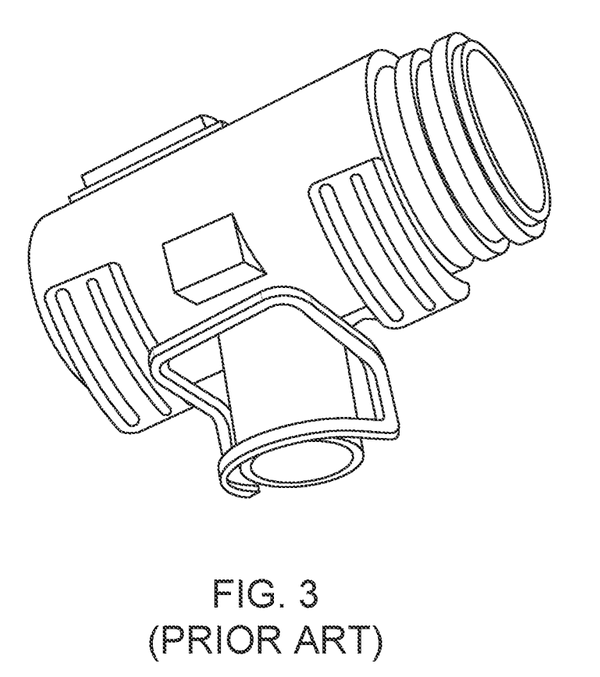
FIG. 3 shows a prior art connection manifold for connecting conduit segments of different sizes.
Figure 4:
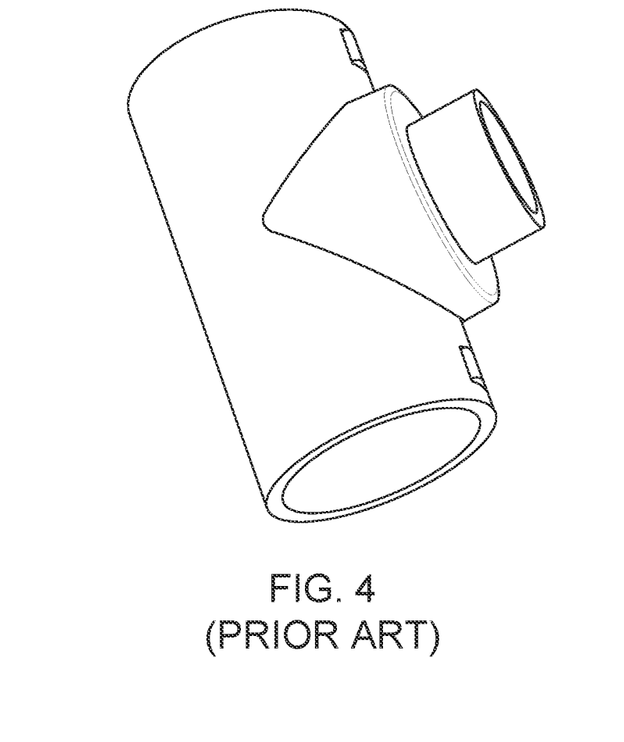
FIG. 4 shows a prior art connection manifold for connecting conduit segments of different sizes.

As noted above a harness may specify and require a conduit segment at one point in the harness of one dimension but at a connection, such as T-intersection, it would require another segment of a different diameter. Prior art FIGS. 3 and 4 show different T-shaped connection manifolds where the conduit connection openings at different openings are different sizes.

As a result, when a manufacturer receives a harness design they must not only have the appropriate types of connectors (y-connectors, t-connectors, elbows etc. . . . ) but they also need to have each piece dimensioned correctly for the different sized conduit connections. This leads to need to maintain a large inventory of manifolds to make the necessary connections in different harnesses.

Figure 5:
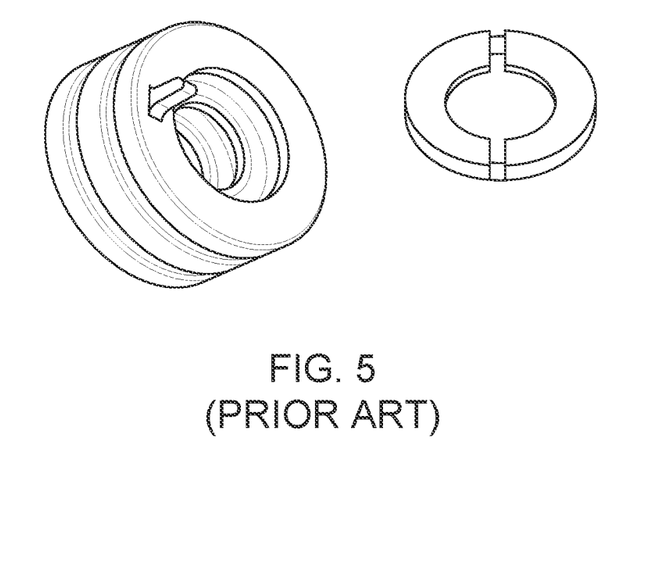
FIG. 5 shows a prior art reducer for connection to the end of a conduit segment prior to connection with connection opening of a manifold.

As shown in prior art FIG. 5 "reducer" such as "coin" type (right) and "ring" type (left) are able to be clipped onto the ends of conduit segments increasing the outer diameter. This allows them to be fitted into manifold openings of larger diameters (i.e. "reducing" the effective size of the manifold opening). However, although these reducers can allow some flexibility with manifold inventory, they are only effective in one direction, namely increasing conduit size/reducing manifold opening size, but not the other way. Such reducers are usually snapped onto the outside of a conduit segment and can come loose during service to the harness. Also these style of reducers typically are more difficult to assemble with them being a loose piece in the assembly process.

OBJECTS AND SUMMARY

The present arrangement overcomes the drawbacks associated with the prior art and provides an adaptive manifold that has two or more connection openings, where each opening is sized the same. Each opening of the manifold has a receiving area for receiving a size adapter that sets the connection size for the conduit to be connected at that opening. In this manner a standard manifold can be used for a given conduit size range and the specific diameter/dimensions for the connection opening is set by using the correct sized size adapter.

To this end an adaptive manifold is provided that includes first and second halves of a manifold body, connected via a hinge, with at last two openings, where the haves are closeable to receive and retain at least two different conduits into the at least two openings. Each of the openings in the manifold are uniformly sized and has a plurality of arcuate retention ribs. Each of the openings are configured to receive a sizing adapter, each sizing adapter having a plurality of securing ribs having an inside and outside surface, such that the outside surface of the securing ribs of the sizing adapters are uniformly sized, arcuate, and adapted to be interfit between the retention ribs of the opening. The inside surfaces of the securing ribs are arcuate and dimensioned to fit into a corrugation of a conduit, so that when the manifold is closed, the conduits are engaged with the inside surfaces of the sizing adapters retaining the conduits within the openings of the manifold.

BRIEF DESCRIPTION OF THE DRAWINGS

The present invention can be best understood through the following description and accompanying drawing, wherein.

DETAILED DESCRIPTION

Figure 6:
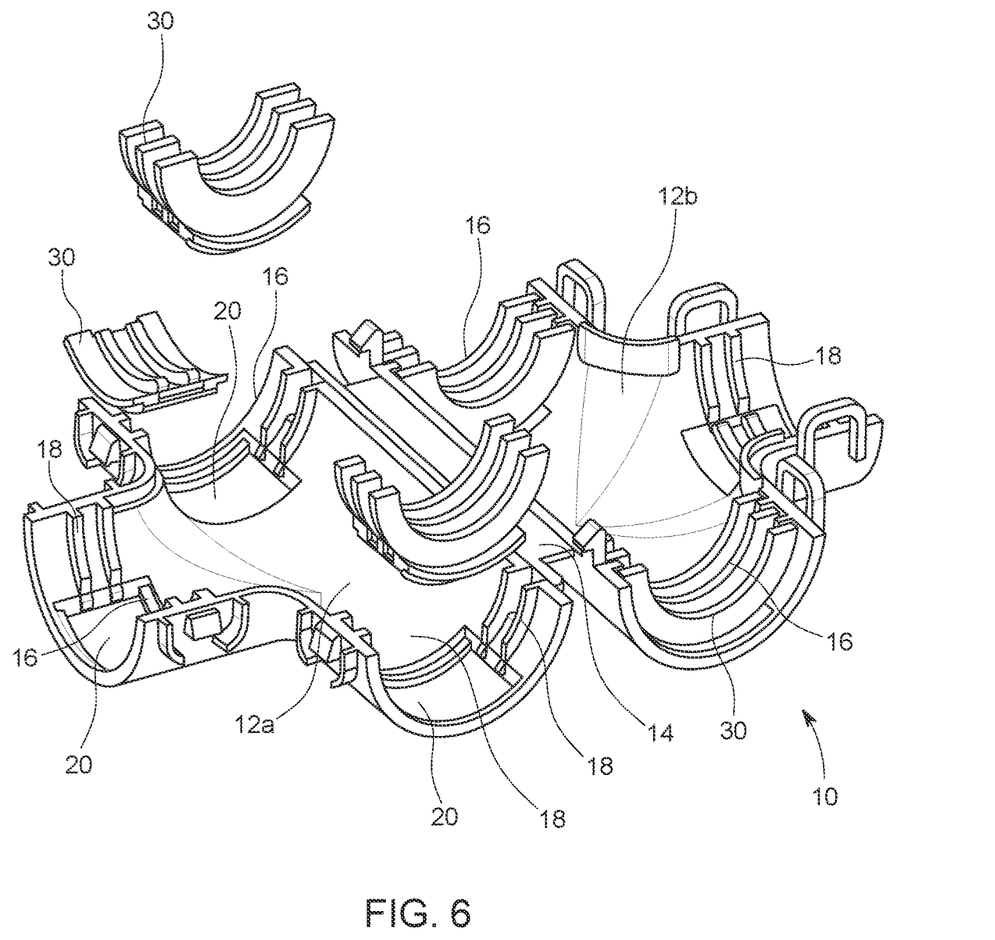
FIG. 6 illustrates and open manifold and size adapters in accordance with one embodiment.

In one embodiment of the present invention as illustrated in FIG. 6, an adaptive manifold 10 is shown in the open state. Manifold 10 has two haves 12a and 12b and a hinge 14 connecting them for eventual closure and locking of conduit segments connected thereto. Typically manifold 10 is made of molded plastic but the invention is not limited in this respect.

Manifold 10 has a plurality of connection openings 16 each of which has arcuate adapter retention ribs 18 and a sizing window 20. In the Example shown in FIG. 6, manifold 10 is t-shaped connector with three (3) openings 16 but other shapes and designs of manifold 10 may be used.

Figure 7:
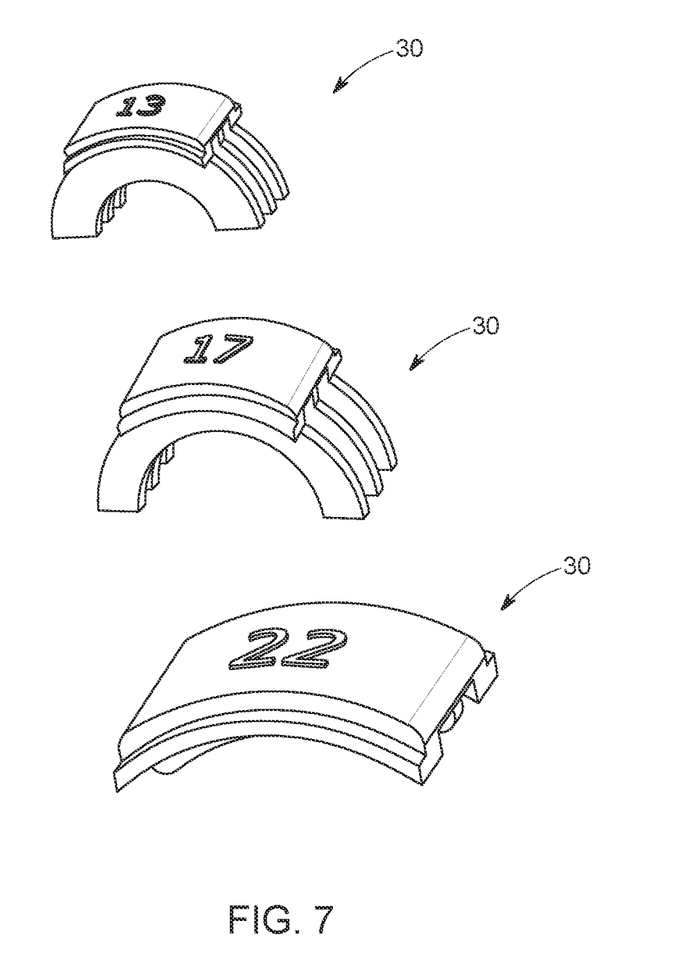
FIG. 7 illustrates a set of size adapters in accordance with one embodiment.

FIG. 7 shows several size adapters 30, each of which has a body 32, with a size numbering 34 and one or more securing ribs 36. Body 32 forms a support for securing ribs to one another. Each securing rib 36 has an inner edge 37 and an outer edge 38. Outer edge 37 of securing ribs 36 is of the same arcuate curvature and dimension of openings 16 and are configured to interfit between retention ribs 18. Inner edge 37 of securing ribs on the other hand are varied from adapter 30 to adapter 30. The arcuate sizing and thickness between outer edge 38 and inner edge 37 is different for each size adapter according to the intended size of a conduit which it is adapted to retain.

For example, as shown in FIG. 7, the first adapter 30 is sized thirteen (13), as indicated at size numbering 34, meaning it is adapted to fit into manifold 10 and holding, via its securing ribs 36, a conduit with a NW of 13 mm, by fitting into the corrugation ribs thereof (see e.g. prior art FIG. 1 and FIG. 2 for conduit shape and sizes. In this arrangement, it is expected that the thickness between inner edge 37 and outer edge 38 of securing ribs 36 is thicker to retain a smaller conduit in an opening 16 of manifold 12.

Also shown in FIG. 7 is middle sized size adapter 30 for a size seventeen (17) conduit. As evident from FIG. 7 the thickness between inner edge 37 and outer edge 38 of securing ribs 36 is smaller than same thickness dimension in the size (13) adapter because it is intended to accept an even larger diameter conduit of a NW 17 mm. The same is true of the last size adapter 30 which is for supporting the largest conduit of a NW 22 mm. Here, inner edge 37 of securing ribs 36 are almost exactly the same dimension of retention ribs 18.

It is noted that in this example in FIGS. 6 and 7, manifold 10 is dimensioned to accept a maximum sized conduit with a NW of (22) (which would theoretically be retained by retention ribs 18 themselves without any size adapter 30 in some cases as they are the same size as securing ribs 36). However, manifold 10 can accept and retain several different smaller sized conduits in openings 16, simply by using different sized size adapter 30. It is contemplated that manifolds 10 can be of different sizes with different standard sized opening 16 (instead of 22 mm in this example) with a series of size adapters 30 that correspond thereto, possible a small medium and large manifold 10. In any case, each manifold 10 regardless of the size of openings 16, the same size may be used for all openings 16 in that manifold 10, which variations on the operable size of opening 16 being set by different sized size adapters 30.

Figure 8:
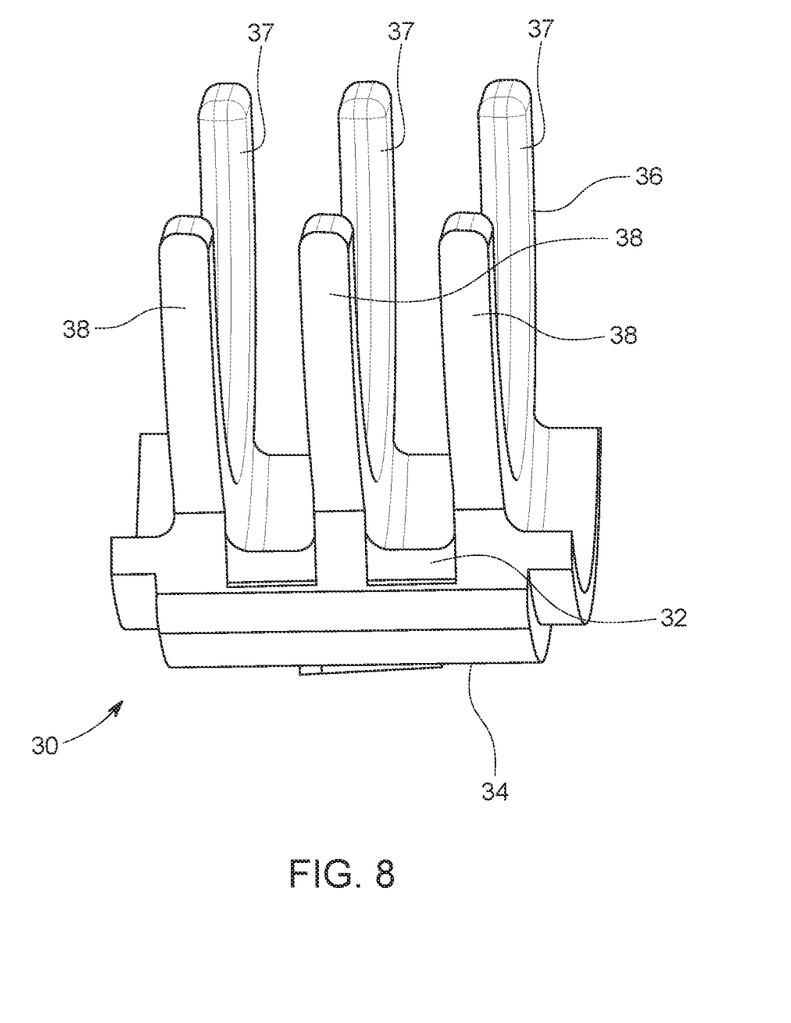
FIG. 8 is a close up perspective view of a size adapter in accordance with one embodiment.
Figure 9:
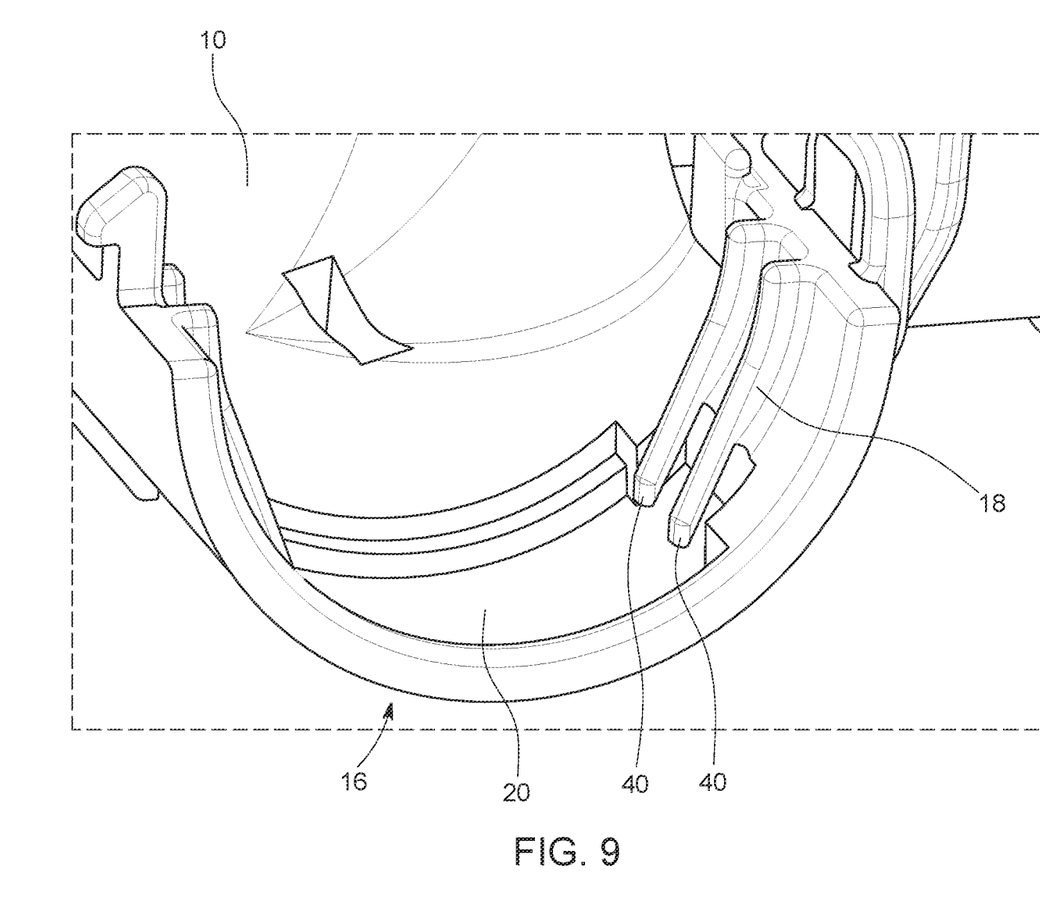
FIG. 9 is a close up of an opening of a manifold in accordance with one embodiment.
Figure 10:
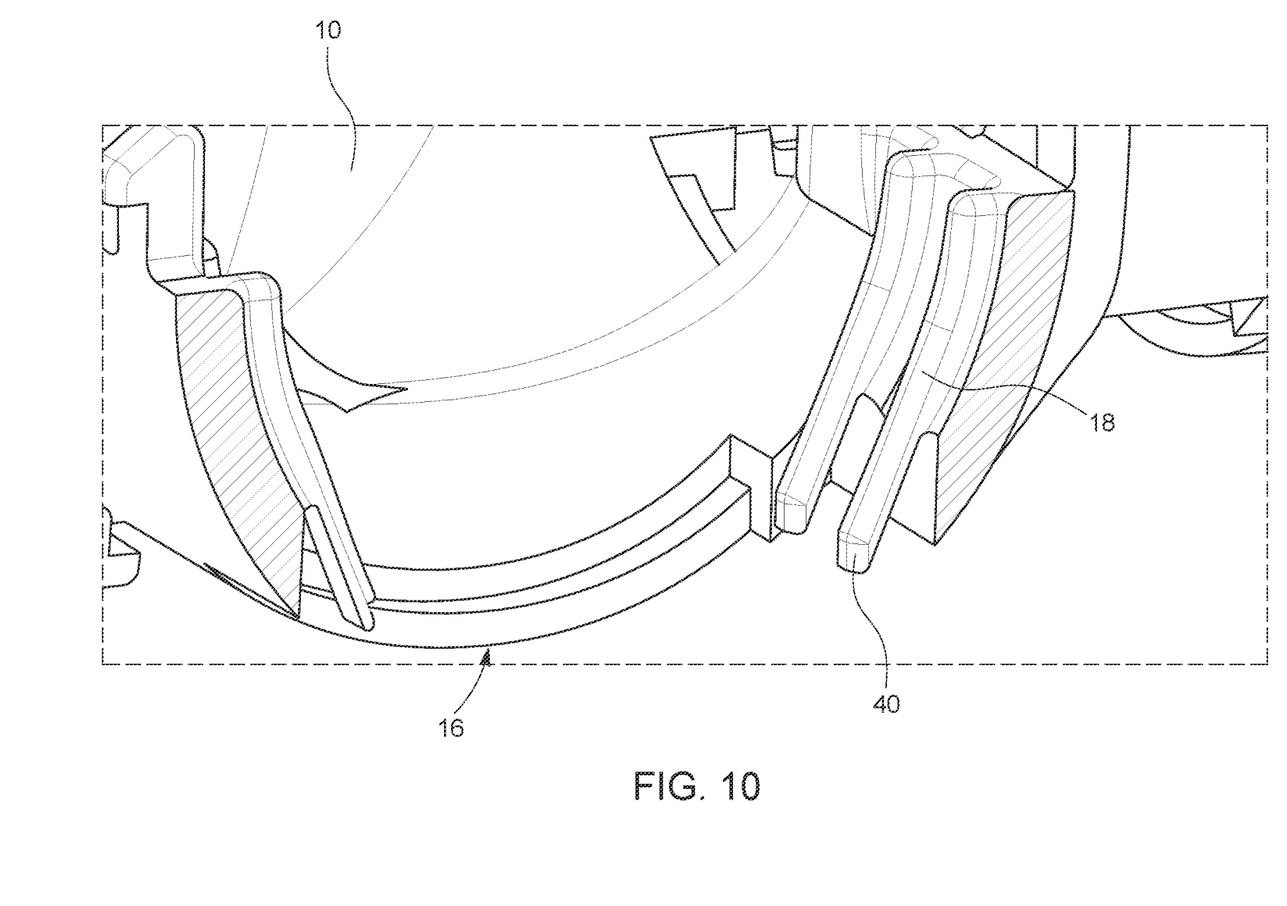
FIG. 10 is a close up cut away of an opening of a manifold in accordance with one embodiment.

FIG. 8 illustrates a close up of adapter 30 from a different perspective, providing a clearer view of body 32 and securing ribs 36. FIGS. 9-10 show a close up of opening 16 in manifold 10 at the location where size adapter 30 is placed. FIG. 9 is a full image and FIG. 10 is a partial cut away of the same image. These images show that each securing rib 36 includes a plastically deformable terminal prong 40 that extends downward into sizing window 20.

Figure 11:
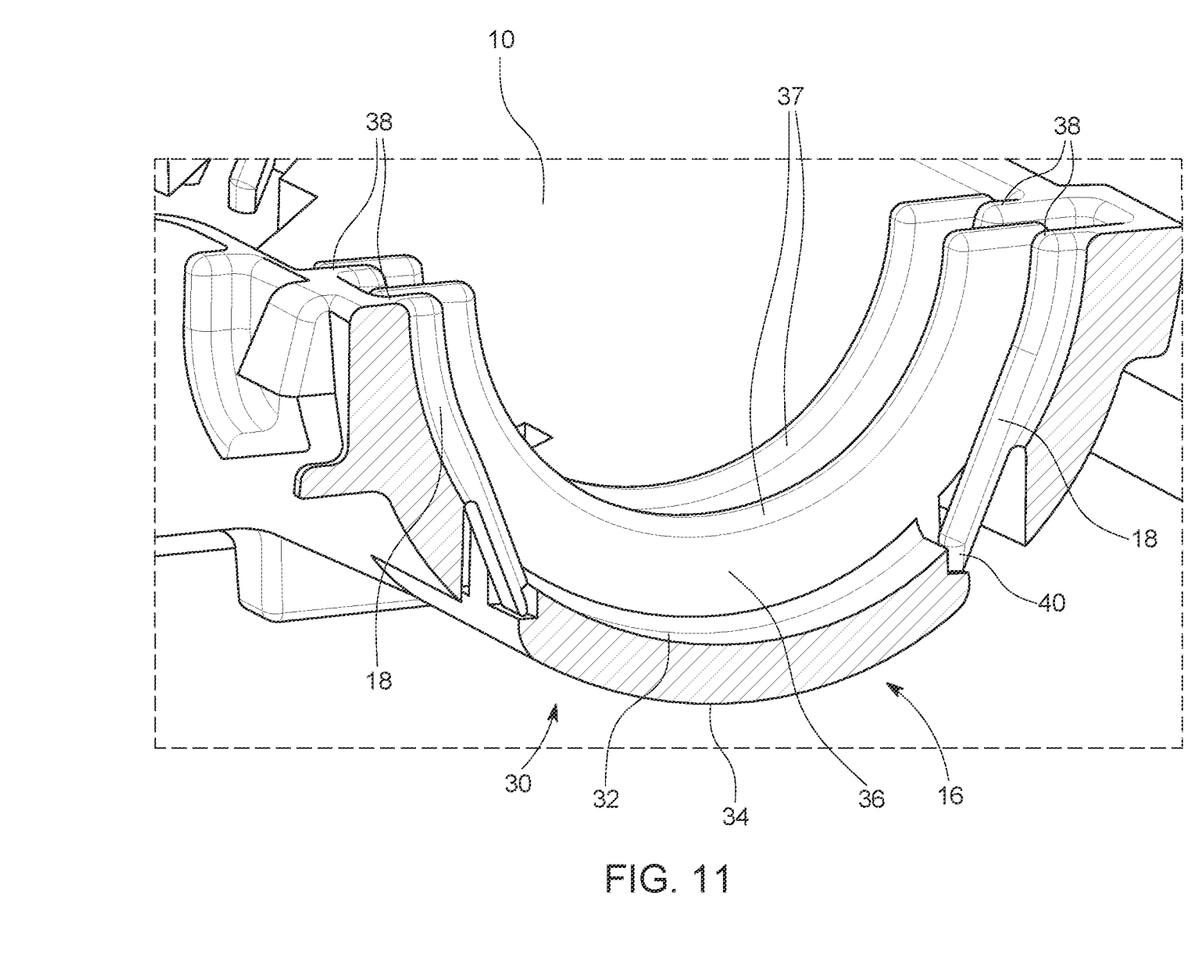
FIG. 11 is a close up of an opening of a manifold with a size adapter therein in accordance with one embodiment.

As shown in FIG. 11, size adapter 30 I fitted into opening 16 such that body 32 and numbering face 34 are fitted into sizing window 20 which securing ribs 36 interspersed and locked between retention ribs 18. In this embodiment shown in FIG. 11, size adapter 30 is snap fit into opening 16. In this arrangement terminal prongs 40 are deformed as adapter 30 (body 32 and number plate 34) are pressed into sizing number window 20. Sizing adapter 30 has a corresponding lock notch 42 between body 32 and size number 34 that allows deformed prongs 40 to snap back and lock adapter 30 in place.

Figure 12:
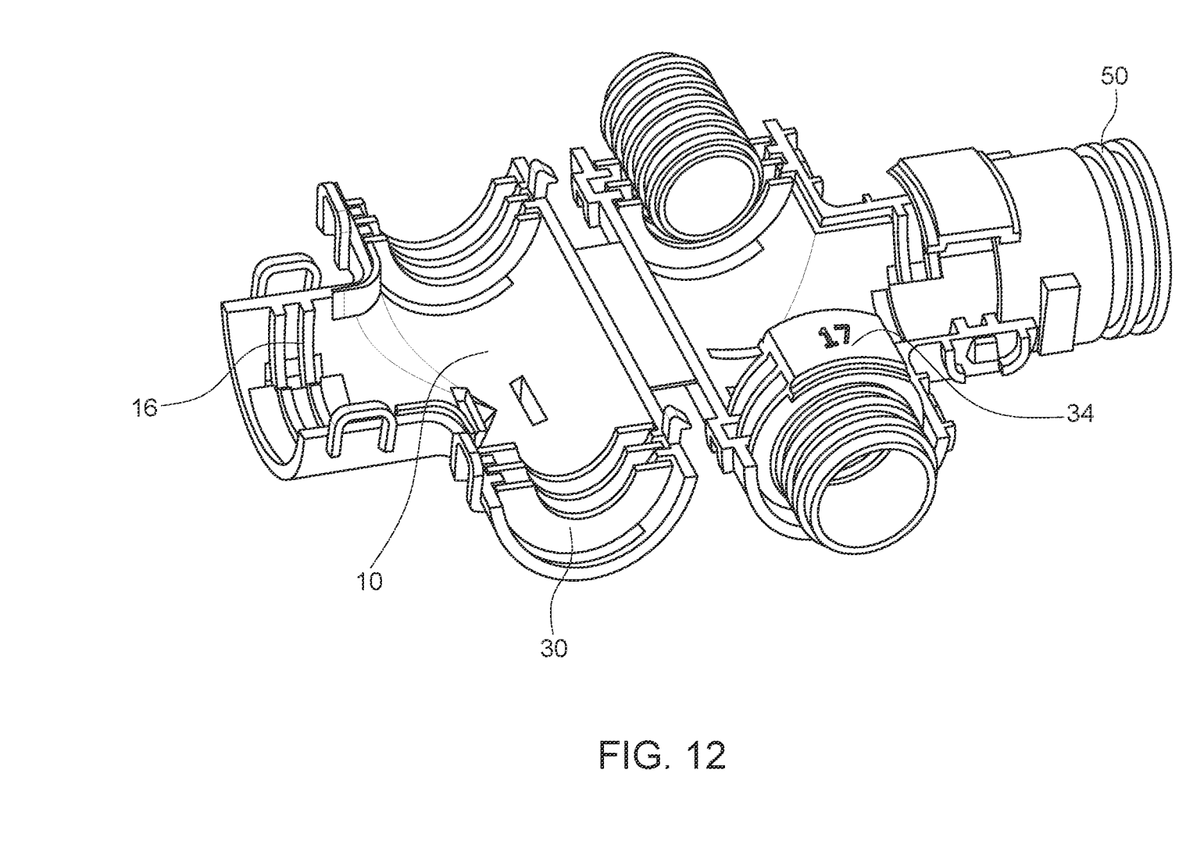
FIG. 12 shows an open manifold with adapters, conduits and a connection adapter in accordance with one embodiment.
Figure 13:
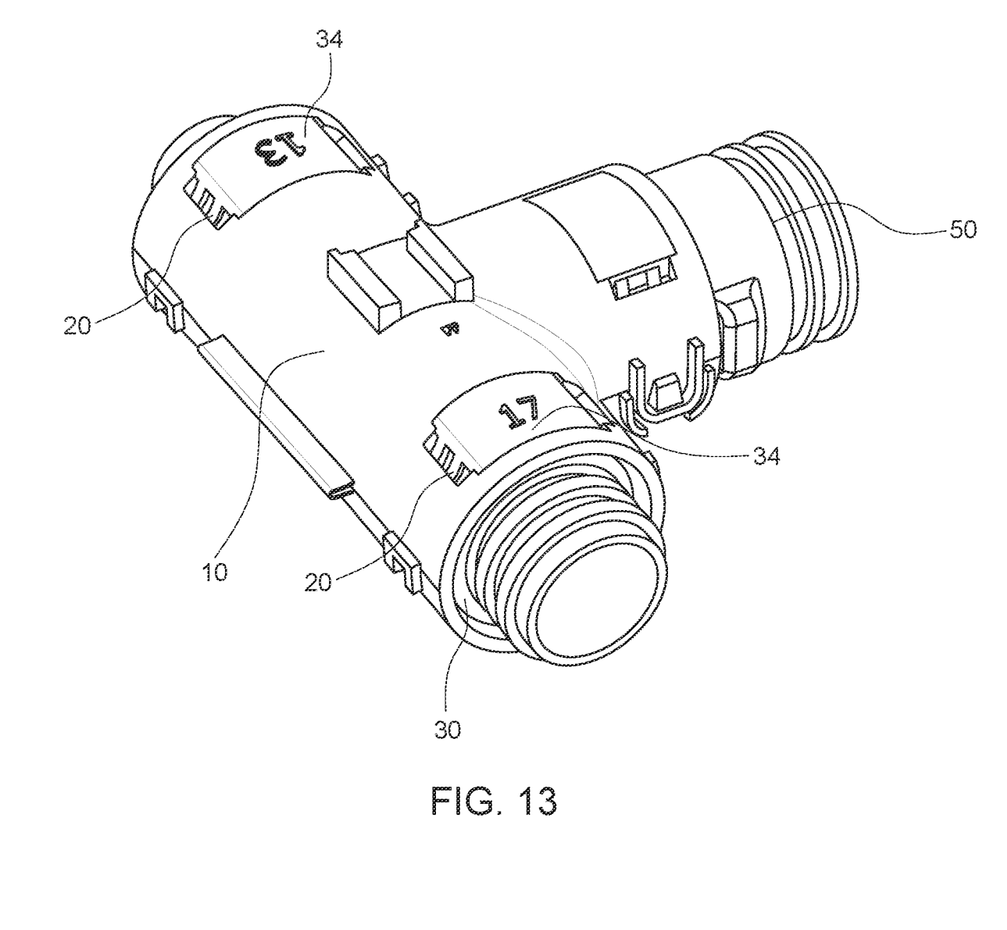
FIG. 13 shows a closed manifold with adapters, conduits and a connection adapter in accordance with one embodiment.
Figure 14:
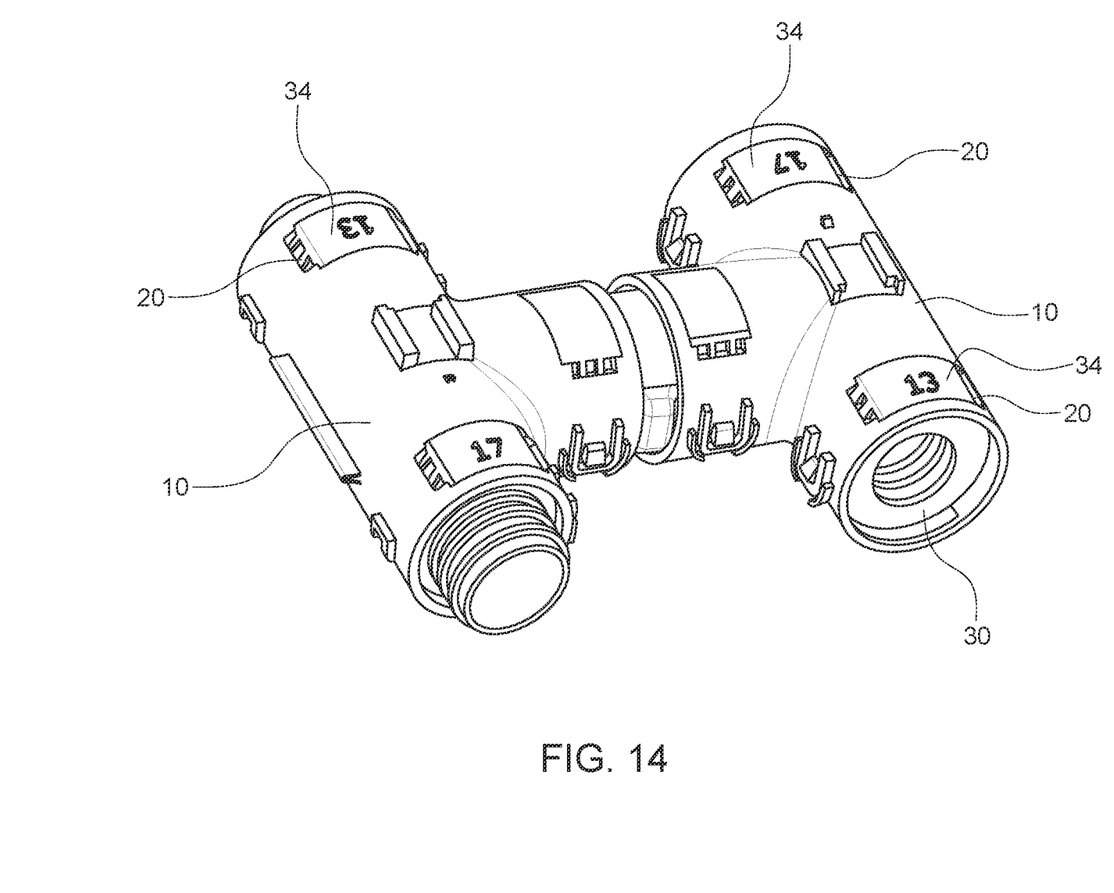
FIG. 14 shows two connected manifolds via connection adapter, both closed, in accordance with one embodiment.

It is noted that such adapters 30 are intended to be essentially permanently retained in manifold 10 in this manner, but it is possible with appropriate tooling to bend prongs 40 and release adapter 30. Also, not shown, it is possible that size adapter 30 can simply be press fit into opening 16 and sizing window 20 with no locking mechanism via prongs 40 and notch 42, should a manufacturer prefer easier insertion and removal of different adapters 30. FIGS. 12-14 illustrate an open and closed version of manifold 10 based on the above mentioned descriptions. As illustrated in FIG. 12 two different sized conduits (13 mm and 17 mm) are placed in two of openings 16 and the third opening has an equal sized connection adapter 50 for connecting to an adjacent manifold 10, in a case where two manifolds 10 are to be coupled together without a connecting conduit. As shown in FIG. 13, when two halves 12a and 12b are closed via hinge 14, manifold 10 is closed and able to grip two differently sized conduits on either side, because of the use of the correct sized adapters 30 despite openings 16 being the same uniform sized. FIG. 14 shows two closed manifolds 10, manifold 10 from FIG. 13 connected to an empty manifold 10 via adapter 50. Additionally, as seen in both FIGS. 13 and 14, in the closed configuration, size opening 20 allows a user viewing externally to clearly see the adapter sizing 34 of adapter 30.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An adaptive manifold comprising:
   First and second halves of a manifold body, connected via a hinge, with at last two openings, where said haves are closeable to receive and retain at least two different conduits into said at least two openings;
   wherein each of said openings in said manifold are uniformly sized,
   wherein each of said openings has a plurality of arcuate retention ribs,
   wherein each of said openings are configured to receive a sizing adapter, each sizing adapter having a plurality of securing ribs having an inside and outside surface, such that said outside surface of said securing ribs of said sizing adapters are uniformly sized, arcuate, and adapted to be interfit between said retention ribs of said opening, and
   wherein said inside surfaces of said securing ribs are arcuate and dimensioned to fit into a corrugation of a conduit, so that when said manifold is closed, said conduits are engaged with said inside surfaces of said sizing adapters retaining said conduits within said openings of said manifold.

2. The adaptive manifold as claimed in claim 1, wherein said manifold is configured to receive at least two different conduits having different outer diameters.

3. The adaptive manifold as claimed in claim 2, wherein said inside surface of said securing ribs of a first sizing adapter are matched to a first conduit having a first outer diameter and wherein said inside surface of said securing ribs of a second sizing adapter are matched to a second conduit having a second outer diameter, said first and second outer diameters being different than each other.

4. The adaptive manifold as claimed in claim 3, wherein at least one of said size adapters is the same size as said connection opening.

5. The adaptive manifold as claimed in claim 3, wherein at least one of said size adapters is the smaller than said connection opening.

6. The adaptive manifold as claimed in claim 1, wherein said retention ribs further include a terminal prong configured to deform as said size adapter is pressed into said connection opening.

7. The adaptive manifold as claimed in claim 6, wherein said terminal prongs, elastically deformed as said size adapter is pressed into said connection opening, springs back into a locking notch in said size adapter.

8. The adaptive manifold as claimed in claim 1, wherein said connection openings include a sizing window.

9. The adaptive manifold as claimed in claim 8, wherein a body of said size adapter includes a size number, such that when said size adapter is pressed into said connection opening, said size number of said size adapter is visible through said size window.

\* \* \* \* \*